United States Patent
Fredericque (10) Patent No.: US 10,162,471 B1
(45) Date of Patent: Dec. 25, 2018

(54) TECHNIQUE TO DYNAMICALLY ENHANCE THE VISUALIZATION OF 3-D POINT CLOUDS

(71) Applicant: Bentley Systems, Incorporated, Exton, PA (US)

(72) Inventor: Benoit Fredericque, Bouvron (FR)

(73) Assignee: Bentley Systems, Incorporated, Exton, PA (US)

( * ) Notice: Subject to any disclaimer, the term of this patent is extended or adjusted under 35 U.S.C. 154(b) by 770 days.

(21) Appl. No.: 13/631,097

(22) Filed: Sep. 28, 2012

(51) Int. Cl.
  *G06F 1/00* (2006.01)
  *G06F 3/048* (2013.01)

(52) U.S. Cl.
  CPC ............... *G06F 3/048* (2013.01); *G06F 1/00* (2013.01)

(58) Field of Classification Search
  CPC .. G09G 5/08; G06F 15/00; G06K 9/00; A61B 8/00; G06T 15/00
  USPC .......... 345/163, 426, 423; 382/109; 600/443
  See application file for complete search history.

(56) References Cited

U.S. PATENT DOCUMENTS

| | | | | |
|---|---|---|---|---|
| 4,812,829 A * | 3/1989 | Ebina et al. | ................... | 345/159 |
| 5,513,276 A | 4/1996 | Theodoracatos | | |
| 5,844,566 A * | 12/1998 | Lecland et al. | ............... | 345/426 |
| 5,988,862 A | 11/1999 | Kacyra et al. | | |
| 6,692,441 B1 * | 2/2004 | Poland | .................... | G06T 15/08 |
| | | | | 128/916 |
| 8,078,396 B2 | 12/2011 | Meadow et al. | | |
| 8,600,708 B1 * | 12/2013 | Mallet | .................... | G06T 17/05 |
| | | | | 703/2 |
| 2002/0084982 A1 * | 7/2002 | Rosenberg | ............. | G06F 3/016 |
| | | | | 345/157 |
| 2005/0049479 A1 * | 3/2005 | Brandl | .................... | A61B 8/14 |
| | | | | 600/407 |
| 2005/0090743 A1 * | 4/2005 | Kawashima | ............. | A61B 5/06 |
| | | | | 600/443 |
| 2006/0279630 A1 | 12/2006 | Aggarwal et al. | | |
| 2008/0238836 A1 | 10/2008 | Uchino et al. | | |
| 2009/0103773 A1 | 4/2009 | Wheeler et al. | | |
| 2009/0231327 A1 | 9/2009 | Minear et al. | | |
| 2010/0144436 A1 | 6/2010 | Marks et al. | | |

(Continued)

OTHER PUBLICATIONS

"Bentley Descartes V8i (SELECTseries 2) Help," Bentley Systems, Incorporated, Jul. 16, 2010, pp. 1-53.

(Continued)

*Primary Examiner* — Chad M Dicke
(74) *Attorney, Agent, or Firm* — Cesari and McKenna, LLP; James A. Blanchette (57) ABSTRACT

In one embodiment, a tool dynamically highlights (e.g., re-colors) portions (e.g., points) of a 3-D representation (e.g., point cloud) based on their location relative to a cursor controlled by the user. A virtual region (e.g., virtual cylinder) is associated with the location of the cursor, and is moved in response to cursor movements. As the user moves the cursor on the display screen, the virtual region is moved in 3-D space. The virtual region may have a user-selected size and a user-selected orientation in 3-D space. Portions (e.g., points) of the 3-D representation (e.g., point cloud) that fall within the virtual region are highlighted (e.g., re-colored). Portions of the representation outside of the virtual region may remain unchanged. As the virtual region is moved in 3-D space, the highlighted portions (e.g., points) are dynamically changed.

25 Claims, 9 Drawing Sheets

(56) References Cited

U.S. PATENT DOCUMENTS

| | | |
|---|---|---|
| 2010/0207936 A1 | 8/2010 | Minear et al. |
| 2010/0208981 A1 | 8/2010 | Minear et al. |
| 2010/0220895 A1* | 9/2010 | Koren ................ G01V 1/345 |
| | | 382/109 |
| 2011/0115812 A1 | 5/2011 | Minear et al. |
| 2011/0181590 A1* | 7/2011 | Brabec ................ G06T 11/001 |
| | | 345/424 |
| 2011/0187704 A1 | 8/2011 | Chen et al. |
| 2011/0187716 A1 | 8/2011 | Chen et al. |
| 2011/0187723 A1 | 8/2011 | Chen et al. |
| 2011/0194270 A1 | 8/2011 | Di Trapani et al. |
| 2011/0255764 A1* | 10/2011 | Lin .................... G06T 19/00 |
| | | 382/131 |
| 2012/0327083 A1* | 12/2012 | Nishimura .......... G06F 3/04815 |
| | | 345/419 |

OTHER PUBLICATIONS

"MicroStation V8i (SELECTseries 2) Help," Bentley Systems, Incorporated, Jul. 8, 2010, Selected Pages pp. 1-77.

"MicroStation-AccuSnap Tech Note," Washington State Department of Transportation, Sep. 2, 2010, pp. 1-4.

U.S. Appl. No. 13/287,795, filed Nov. 2, 2011 by Stephane Cote et al. For a Technique for Enhanced Perception of 3-D Structure in Point Clouds, all pages.

U.S. Appl. No. 13/618,842, filed Sep. 14, 2012 by Stephane Cote et al. for a A Two-Dimensionally Controlled Intuitive Tool for Point Cloud Exploration and Modeling, all pages.

* cited by examiner

TECHNIQUE TO DYNAMICALLY ENHANCE THE VISUALIZATION OF 3-D POINT CLOUDS

BACKGROUND

Technical Field

The present disclosure relates to techniques to enhance visualization of three-dimensional (3-D) representations shown on a display screen, and in one specific embodiment, to techniques for enhancing visualization of 3-D points clouds displayed on a display screen.

Background Information

Three-dimensional (3-D) laser scanners are increasingly being used to accurately and quickly capture the shape of physical subjects, such as discrete objects, portions of structures, terrain, or other parts of the physical environment. Such scanners capture a point cloud of geometric samples on the surface of the subject. To accomplish this task, a 3-D laser scanner typically emits some form of coherent light and detects its reflection from the surface of the physical subject. Some 3-D laser scanners rely on time-of-flight. In a time-of-flight 3-D laser scanner, a laser emits pulses of coherent light in a grid-like pattern to scan the physical subject. A laser rangefinder finds the distance to the surface of the physical subject for each pulse of coherent light by timing the round-trip-time of the pulse of light, from its emission, to its reflection back to the laser rangefinder. Other 3-D laser scanners rely on some form of triangulation like a time-of-flight 3-D laser scanner, a triangulation 3-D laser scanner also emits coherent light in a grid-like pattern to scan the physical subject. However, rather than measure time-of flight, an offset camera is employed to look for the location where the coherent light strikes the subject (i.e. a laser dot). Depending on how far away the coherent light strikes the surface, the laser dot appears at different places in the camera's field of view, which can be used in a triangulation calculation to determine distance.

In either case, a point cloud of geometric samples is produced by repeated application of the technique, where each point of the point cloud is associated with a particular x-axis, y-axis and z-axis position on the surface of the physical subject. The points of the point cloud can be used to extrapolate the shape of the physical subject, which may be translated into a more readily used form through a reconstruction process. In reconstruction, the points of the point cloud are often used to construct a vector-based model, where the subject is represented by vector elements based on mathematical formulas, rather than on a large number of discrete points. Creating a vector-based model from a point cloud is generally a difficult process that requires at least some user-involvement in selecting which points of the point cloud should be used as the basis for vector elements. A user may be shown a rendition of the point cloud on a display of a computer system. He or she may then be called upon to "draw" vector elements (e.g., lines, polygons, etc.) using points of the point cloud as a guide. To "draw" vector elements, a user may be required to select a first point of the point cloud. The user may then select one or more other points to define the bounds of the vector element.

Unfortunately, there are a number of issues that complicate reconstruction. When displayed on a display screen, a point cloud typically appears flat. While each point in the point cloud may represent data at a different distance in 3-D space from a viewing position in the 3-D space, when displayed on a display screen, the points are generally shown without any perspective effects. Absent visual depth information, it is difficult for a user to discern how far away from the viewing position a point is in 3-D space.

Further, point clouds are often discontinuous. Points that visually appear proxi-mate to each other on a display screen may not be part of the same surface in 3-D space, but may instead be derived from surfaces in that simply happen to be aligned with respect to the viewing position in 3-D space. A point from a deeper surface may be shown next to a point from a closer surface, simply because those surfaces "overlap" when viewed from a certain perspective. It is difficult for a user to definitively determine whether two points are part of the same surface or are parts of different surfaces.

Various approaches have attempted to try to address these issues. One approach has been slice a point cloud into a number of two-dimensional (2-D) sections, and have the user individually examine these 2-D sections. A user may first define a sectioning plane through the point cloud. 2-D sections may be taken that are normal to the sectioning plane, for example, at consistent intervals. The user may view a particular 2-D section, and then move forward or back from the particular section along the sectioning plane and examine additional sections. In this manner, analysis of the 3-D point cloud is transformed into a sequence of individual analyses of 2-D sections.

While such an approach may be functional, it has a number of disadvantages. First, 3-D context information for points in the point cloud may be lost when a user fo-cuses only on an individual 2-D section. Points of the point cloud that may provide help-ful 3-D context may be relegated to neighboring sections, that may not be visible, or may be visible only in a separate view. Second, detail in the point cloud may be hidden by the sectioning process. For example, when 2-D sections are taken at intervals, at least some points located between these intervals may not be included in any section. Accordingly, when the user views the 2-D sections, the additional details such points would provide is lost. Third, valuable user time may be consumed sectioning the point cloud, and navi-gating among the various 2-D section. Among other things, a user may have to activate a tool, or enter a command, each time he or she needs to move forward or back along the sectioning plane. This can prove burdensome.

Accordingly, there is a need for improved techniques for visualizing a 3-D representation (e.g., a 3-D point cloud) that address these shortcomings.

SUMMARY

In one embodiment, a special tool is provided that dynamically highlights (e.g., re-colors) portions (e.g., points) of a 3-D representation (e.g., point cloud) based on their location relative to a cursor controlled by the user. A virtual region (e.g., virtual cylinder) is associated with the location of the cursor, and is moved in response to cursor movements. As the user moves the cursor, the virtual region is moved in 3-D space. The virtual region may have a user-selected size and a user-selected orientation in 3-D space. Portions (e.g., points) of the 3-D representation (e.g., point cloud) that fall within the virtual region are highlighted (e.g., re-colored). Portions of the representation outside of the virtual region may remain unchanged. As the virtual region is moved in 3-D space, the highlighted portions (e.g., points) are dynamically changed. Such operation may effectively create a "local" section that moves in association with movement of the cursor, and that is visible simultaneously with the rest of the representation.

In one embodiment, the virtual region (e.g., virtual cylinder) is defined in reference to a cursor plane (e.g., a plane defined by a point associated with the location of the cursor and a normal vector that extends in the user-selected orientation). The virtual region may be aligned with the normal vector. For example its axis (e.g., the axis of the virtual cylinder) may extend along the normal vector. Further, the virtual region may be bisected by the cursor plane, for example, with equal parts of the virtual region disposed to either side of the plane. A part (e.g., cylinder segment) of the virtual region within a user-selected threshold distance of the cursor plane may be considered an "on plane" part of the virtual region. A part of the virtual region (e.g., cylinder segment) ahead of the "on plane" part, in the direction of the normal vector, may be considered a "forward" part. Similarly, a part of the virtual region (e.g., cylinder segment) behind the "on plane" part, away from the direction of the normal vector, may be considered a "backward" part.

In one embodiment, the highlighting (e.g., re-coloring) applied may differ depending on the part of the virtual region. For example, portions (e.g., points) within the "on plane" part may be highlighted in a first manner (e.g., re-colored a first color, such as red). The portions (e.g., points) within the "forward" part may be highlighted in a second manner (e.g., re-colored a second color, such as green). Likewise, portions (e.g., points) within the "backward" part may be highlighted in a third manner (e.g., re-colored a third color, such as blue). The differing highlighting (e.g., re-coloring) may provide an indication of relative location within the 3-D representation (e.g., point cloud).

BRIEF DESCRIPTION OF THE DRAWINGS

The detailed description below refers to the accompanying drawings of example embodiments, of which.

DETAILED DESCRIPTION

Figure 1:
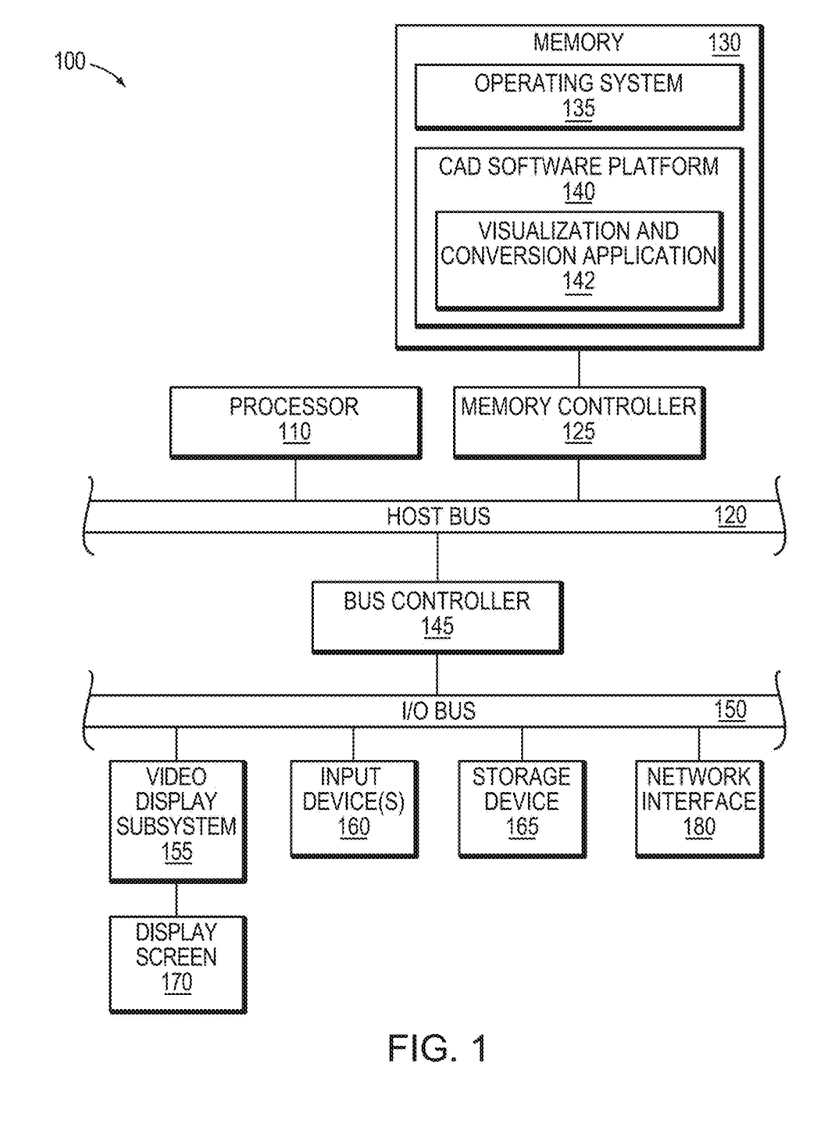
FIG. 1 is a block diagram of an example electronic device in which at least some of the presently described techniques may be employed.

FIG. 1 is a block diagram of an example electronic device 100, (e.g., a computer), in which at least some of the presently described techniques may be employed. The electronic device 100 includes at least one processor 110 coupled to a host bus 120. The processor 110 may be any of a variety of commercially available processors, such as an Intel x86 processor, or another type of processor. A volatile memory 130, such as a Ran-dom Access Memory (RAM), is coupled to the host bus 120 via a memory controller 125. The memory 130 is configured to store at least a portion of computer-executable instructions and data for an operating system 135 while the electronic device 100 is operating. In addition, the memory 130 may store at least portions of a computer aided design (CAD) software platform 140 on which a wide variety of task-specific applications may be based. The CAD software platform 140 may provide base functionality relating to object management, geometric relationships, information and standards management, visualization, drawing and report extraction, and the like. In one embodiment, the CAD software platform is the MicroStation® V8i CAD software platform, available from Bentley Systems Inc. A number of task-specific applications, including a visualization and conversion application 142 that includes functionality and tools for raster-to-vector conversion, may provide additional functionality leveraging the base functionality of the CAD software platform 140. In one embodiment, the visualization and conversion application 142 is the Bentley® Descartes visualization and conversion application, available from Bentley Systems Inc.

The host bus 120 of the electronic device 100 is coupled to an input/output (I/O) bus 150 through a bus controller 145. A video display subsystem 155 may include a display screen 170, such as a 2-D display screen, and hardware to drive the display screen. The video display subsystem 155 is coupled to the I/O bus 150. The display screen 170, among other functions, may show a user interface of the visualization and conversion application 142. One or more input devices 160 are provided and used for interaction with the electronic device 100, and the visualization and conversion application 142 executing on the electronic device. The input devices 160 may include a pointing device (e.g., a 2-D pointing device, such as a mouse, touchpad, trackball, etc. that tracks movements in two dimensions) used to manipulate a cursor on the display screen 170. The input devices 160 may also include one or more other types of devices (e.g., keyboards, stand-alone controls, etc.) that are configured to receive input actions (e.g., key-presses, button-presses, scrolls etc.).

A persistent storage device 165, such as a hard disk drive, a solid-state drive, or other type or persistent data store, is coupled to the I/O bus 150, and may persistently store computer-executable instructions and data, that are available to be loaded to the volatile memory 130 when needed. For example, computer-executable instructions and data for the operating system 135, and the CAD software platform 140, and the visualization and conversion application 142, may be stored in the persistent storage device 165. The I/O bus 150 may further be coupled to a network interface 180 that interfaces with a computer network (not shown). The computer network may allow communication between the electronic device 100 and other devices, using any of a number of well known networking protocols, including wireless networking protocols, to permit a variety of dis-tributed, collaborative or remote computing configurations.

A user may utilize a user interface of the above mentioned visualization and conversion application 142 to view on the display screen 170 a representation, for example, a point cloud. The point cloud may be composed of geometric samples descriptive of the shape of a physical subject, such as a discrete object, portions of a structure, terrain, or other parts of the physical environment. The geometric samples may be captured by a 3-D laser scanner or other device. The point cloud may be utilized for a variety of pur-poses. In some cases, the point cloud may be utilized as a starting point for creating a vector-based model.

According to an embodiment of the present disclosure, a special tool is provided within the user interface of the visualization and conversion application 142. The tool dynamically highlights, for example re-colors, portion of a 3-D representation based on their location relative to a cursor controlled by the user with a pointing device. The 3-D representation may be a point cloud and the portions may be points of the point cloud located in 3-D space. The tool causes a virtual region to be created that is associated with the location of the cursor, and is moved in response to cursor movements. The virtual region may be shaped as a cylinder, and accordingly may be referred to as a virtual cylinder. The virtual region (e.g., virtual cylinder) may have a user-selected size, and a user-selected orientation in the 3-D space of the 3-D representation (e.g., point cloud). As the user moves the cursor on the display screen 170, the virtual region (e.g., virtual cylinder) may be moved in the 3-D space. The user does not have to explicitly move the virtual region forward or back. Portion (e.g., points) of the 3-D representation (e.g., point cloud) that fall within the virtual cylinder are highlighted (e.g., re-colored), while points of the point cloud outside of the virtual region may remain unchanged. As the virtual region is moved in 3-D space, the points that are highlighted dynamically changes. Such operation may effectively create a "local" section that moves with the cursor, which is visible simultaneously with the rest of the representation.

Figure 2:
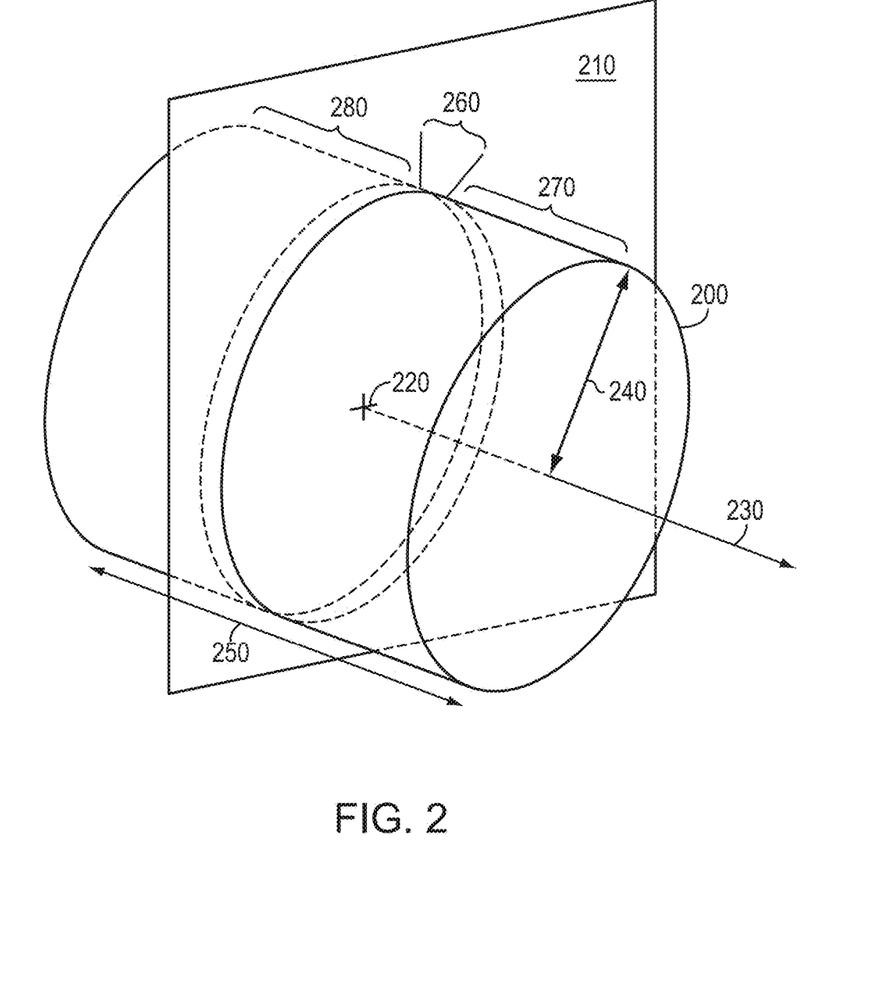
FIG. 2 is a schematic diagram of an example virtual region.

FIG. 2 is a schematic diagram of an example virtual region, specifically, an example virtual cylinder 200. The virtual cylinder 200 is defined in reference to a cursor plane 210. The cursor plane 210 may be plane defined by a point 220 that is associated with the location of the cursor, and a normal vector 230 that extends in a user-selected orientation. The axis of the virtual cylinder 200 is aligned with the normal vector 230, while a radius 240 of the virtual cylinder is perpendicular to the normal vector 230. A size of the virtual cylinder 200 may be defined through selection of the radius 250 and a height 250 by the user, for example using the user interface of the user interface of the visualization and conversion application 142.

The virtual region, or more specifically the example virtual cylinder 200, may be bisected by the cursor plane 210. A part (cylinder segment) of the virtual cylinder 200 within a user-selected threshold distance of the cursor plane 210 may be considered an "on plane" part 260 of the virtual cylinder 200. A part (cylinder segment) ahead of the "on plane" part 260, in the direction of the normal vector 230, may be considered a "forward" part 270 of the virtual cylinder 200. Similarly, a part (cylinder segment) behind the "on plane" part 260, away from the direction of the normal vector 230, may be considered a "backward" part 280 of the virtual cylinder 200.

The highlighting, or more specifically re-coloring, applied to portions (e.g., points) of the 3-D representation (e.g., point cloud) may differ depending on the part the point falls within. For example, considering a virtual cylinder, points that fall within the "on plane" part 260 of the virtual cylinder 200 may be re-colored a first color, such as red. The points that fall within the "forward" part 270 may be re-colored a second color, such as green. Likewise, points that fall within the "backward" part 280 may be re-colored a third color, such as blue. The differing re-coloring may provide an indication of relative location within the point cloud.

The position of the virtual region (e.g., virtual cylinder) in 3-D space may be derived from the 2-D location of the cursor on the display screen in an automated manner, for example using an "AccuSnap" function. The AccuSnap function may provide a pointer at a 3-D location based on the location of the cursor in the plane of the display screen. Portions (e.g., points) of the 3-D representation (e.g., point cloud) are projected onto the display screen. When the cursor is remote from the projection of any portions (e.g., points), the AccuSnap function may provide a pointer located in 3-D space at a de-fault depth. This pointer may be used to define the position of the cursor plane 210, and thereby the virtual region (e.g., virtual cylinder). When the cursor is within a threshold distance of the projection of a portions (e.g., point) on the display screen 170, the AccuSnap function may "snap" thereto, such that the pointer is moved to the depth of that portion (e.g., point). The snapped to location of the pointer may be used to define the position of the cursor plane 210, and thereby the virtual region (e.g., virtual cylinder). In such manner, 2-D movement of the pointing device may be translated to positions within 3-D space.

Figure 3:
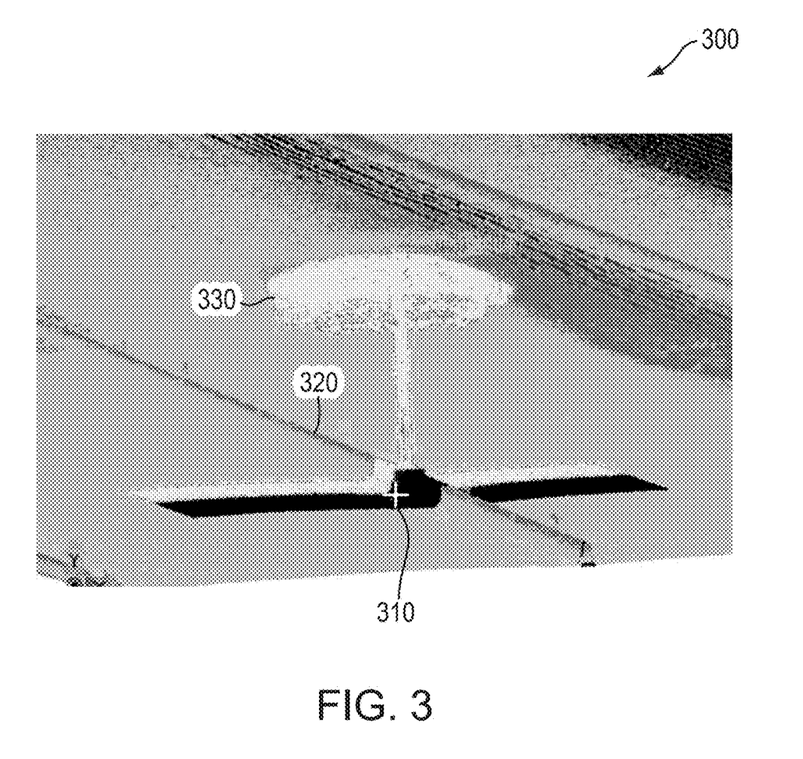
FIG. 3 is first screen shot of example highlighting, specifically re-coloring, caused by an example virtual region, specifically a virtual cylinder.

FIG. 3 is first screen shot 300 of example highlighting, specifically re-coloring, caused by the example virtual region, specifically a virtual cylinder. Here the 3-D representation is a point cloud that represents a highway with a concrete median barrier 320 and a sign structure 330. In the first screen shot 300, the cursor 310 is positioned such that a pointer provided by the AccuSnap function is located along the median barrier 320, approaching the sign structure 330. Accordingly the virtual cylinder (not shown) is arranged such that the sign structure 330 falls within the "forward" part 270, and is re-colored the second color (e.g., green). This re-coloring distinguishes the sign structure 330 from the highway surface. Absent the re-coloring, the sign structure 330 would be difficult to see. Some portions of the median barrier 320 fall within the "on plane" part 260 and within the "backward" part 280, and are re-colored the first and third colors, respectively (e.g., red and blue). This re-coloring may help emphasize the profile of the median barrier 320.

Figure 4:
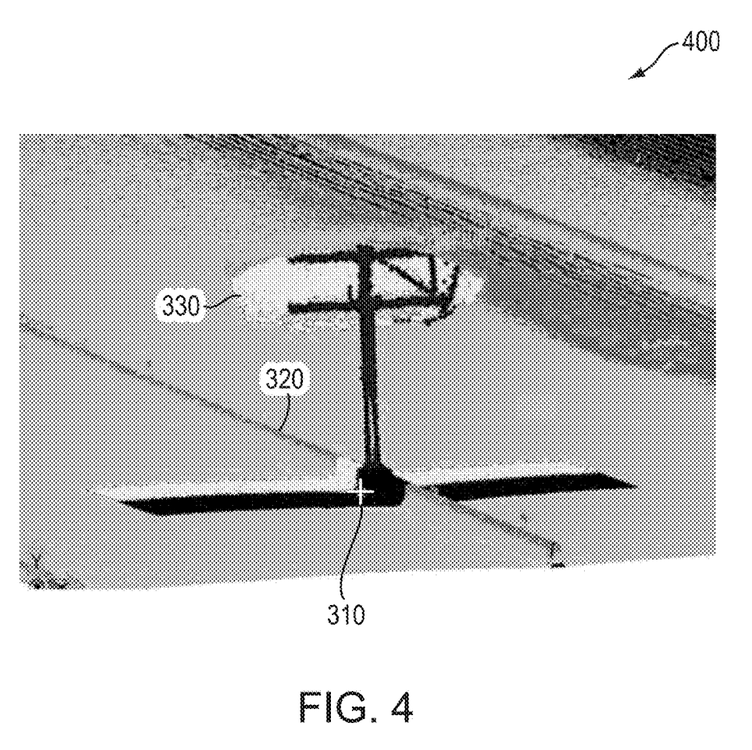
FIG. 4 is a second screen shot of example highlighting within the example point cloud of FIG. 3.

FIG. 4 is second screen shot 400 of example highlighting, specifically re-coloring, within the example point cloud of FIG. 3. In the second screen shot 400, the cursor 310 is positioned such that the pointer is moved slightly forward. Some portions, specifically support girders, of the sign structure 330 now falls within the "on plane" part 260 of the virtual cylinder and are re-colored the first color (e.g., red). Such re-coloring makes them discernable from the rest of the sign structure, which is still re-colored the second color (e.g., green).

Figure 5:
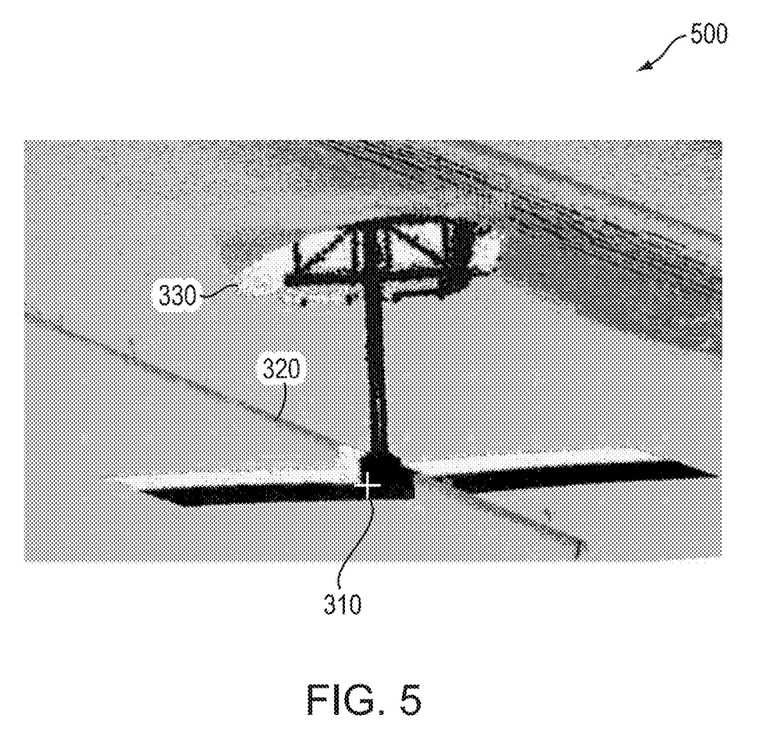
FIG. 5 is a third screen shot of example highlighting within the example point cloud of FIGS. 3 and 4.

FIG. 5 is third screen shot 500 of example highlighting, specifically re-coloring, within the example point cloud of FIGS. 3 and 4. In the third screen shot 500, the cursor 310 is positioned such that the pointer is moved even further forward. As such, more of the sign structure 330 now falls within the "on plane" part 270 of the virtual cylinder and is re-colored the first color (e.g., red), such that greater detail regarding components of the sign structure may be seen.

Figure 6:
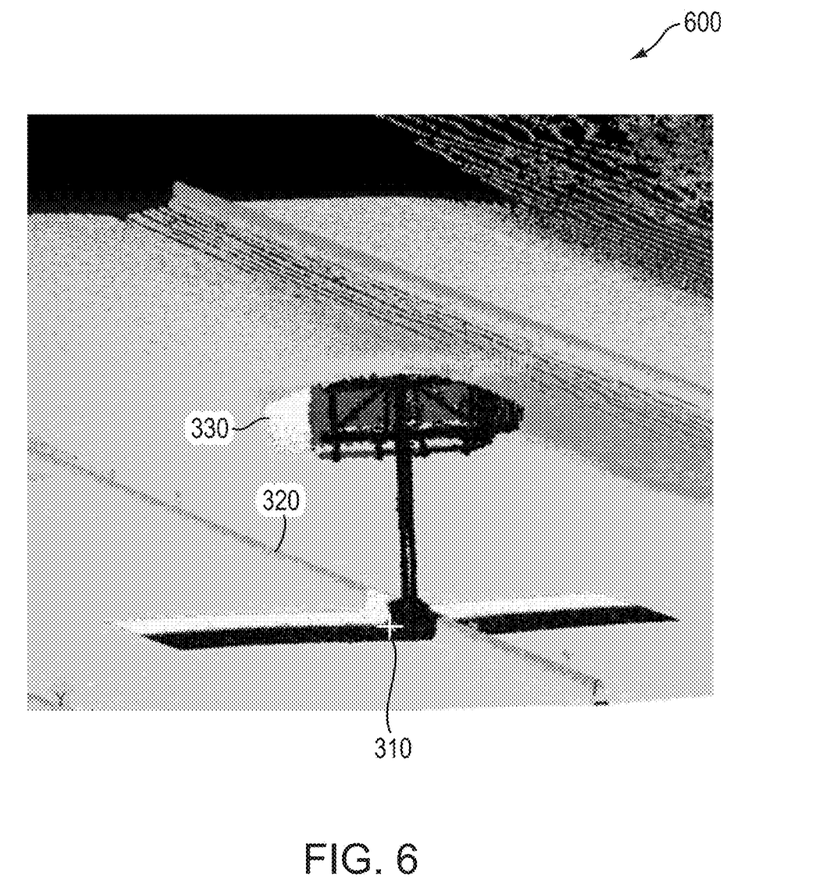
FIG. 6 is fourth screen shot of example highlighting within the example point cloud of FIGS. 3-5.

FIG. 6 is fourth screen shot 600 of example highlighting, specifically re-coloring, within the example point cloud of FIGS. 3-5. In the fourth screen shot 600, the cursor 310 is positioned such that the pointer is moved still further forward. This causes portions of the sign structure 330 to now fall within the "backward" part 280 of the virtual cylinder, such that they are now re-colored the third color (e.g., blue). This may provide a visual indication that the pointer is now located ahead of these portions of the sign structure 330.

Figure 7:
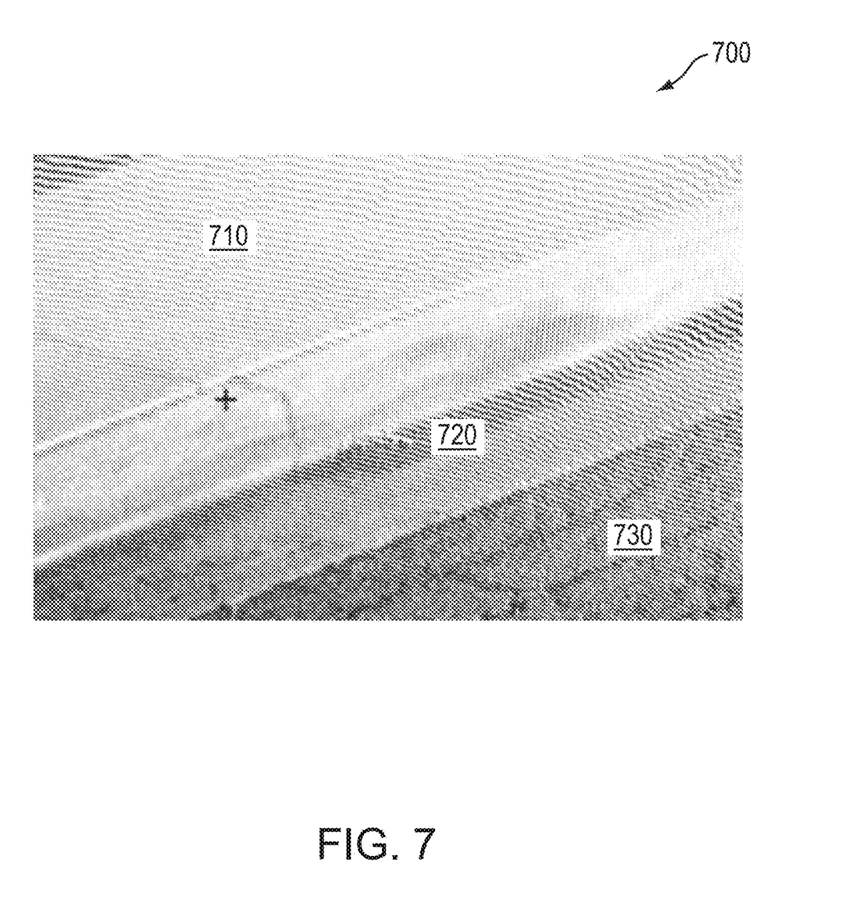
FIG. 7 is a screen shot of an example point cloud that represents the edge of a street, with a sidewalk, gutter and road surface.

FIG. 7 is a screen shot 700 of an example point cloud that represents the edge of a street, with a sidewalk 710, gutter 720 and road surface 730. Simply looking at the points of the point cloud, it is difficult to distinguish these specific features.

Figure 8:
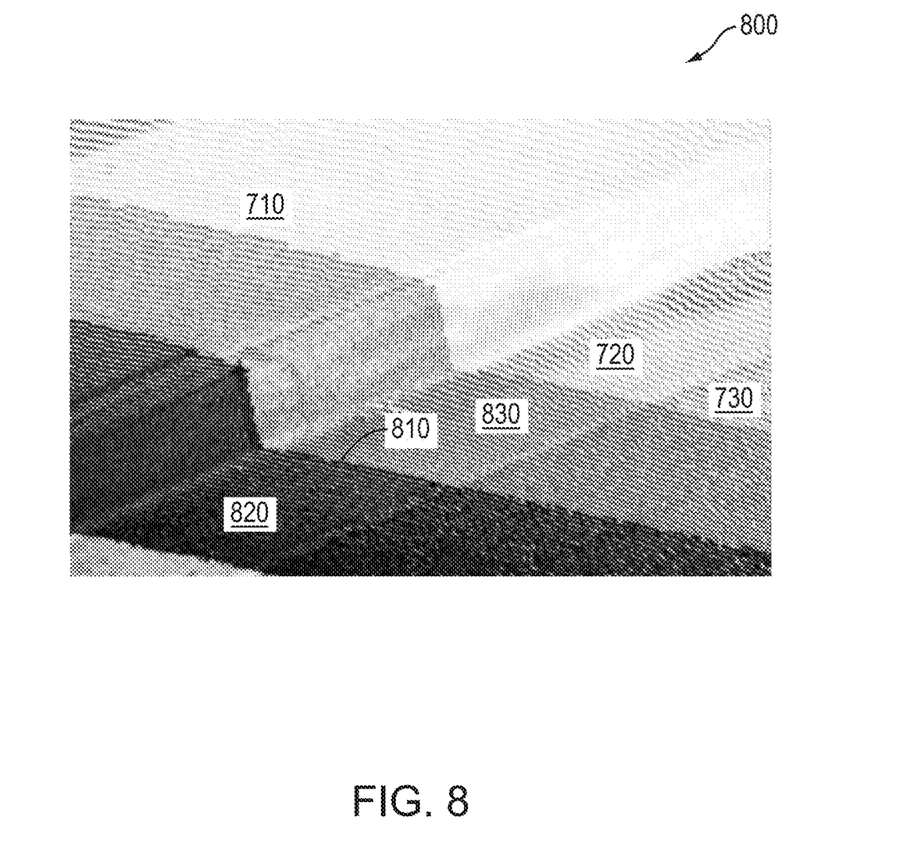
FIG. 8 is a screen shot of highlighting caused by an example virtual region imposed within the point cloud of FIG. 7.

FIG. 8 is a screen shot 800 of highlighting, specifically re-coloring, caused by an example virtual region, specifically a virtual cylinder, imposed within the point cloud of FIG. 7. Portions 810 of the sidewalk 710, gutter 720 and road surface 730 that fall within the "on plane" part 260 of the virtual cylinder are re-colored the first color (e.g., red), while the portions 820 that fall within the "forward" part 270 and the portions 830 that fall within the "backward" part 290 of the virtual cylinder and are re-colored the second and third colors (e.g., green and blue), respectively. Such clarifies the contour of the sidewalk 710, gutter 720 and road surface 730.

Figure 9:
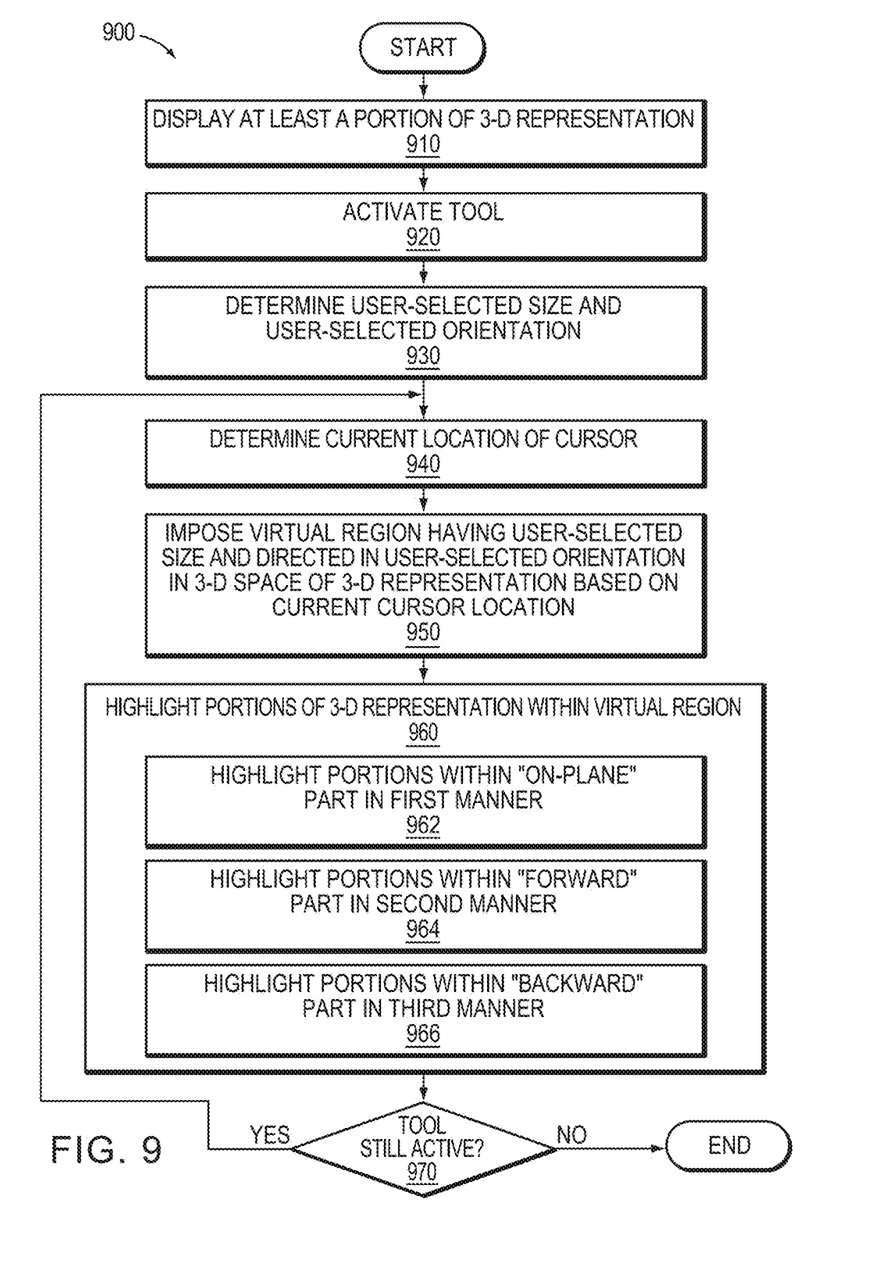
FIG. 9 is an example simplified sequence of steps for dynamically highlighting portions of a 3-D representation based on their location relative to a cursor controlled by the user.

FIG. 9 is an example simplified sequence of steps for dynamically highlighting (e.g., re-coloring) portions (e.g., points) of a 3-D representation (e.g., point cloud) based on their location relative to a cursor controlled by the user. At step 910, at least a portion of the 3-D representation (e.g., point cloud) is displayed on the display screen 170, for example by the visualization and conversion application 142. Each point of the point cloud is associated with a position in 3-D space. At step 920, a tool is activated, for example within the user interface of the visualization and conversion application 142, to aid in visualization of the 3-D representation (e.g., point cloud). At step 930, a user-selected size and a user-selected orientation are determined. At step 940, the current location of a cursor is determined. At step 950, a virtual region (e.g., virtual cylinder) having the user-selected size, and directed in the user-selected orientation, is imposed within the 3-D space of the 3-D representation (e.g., point cloud) based on the current location of the cursor. At step 960, portions (e.g., points) of the 3-D representation (e.g., point cloud) that fall within the virtual region are highlighted (e.g., re-colored). Step 960 may include sub-step 962, where portions that fall within an "on plane" part of the virtual region are highlighted in a first manner, for example, re-colored a first color (e.g., red), sub-step 964, where portions that fall within a "forward" part of the virtual region are highlighted in a second manner, for example, re-colored a second color (e.g., green), and sub-step 966, where portions that fall within a "backward" part of the virtual region are highlighted in a third manner, for example, re-colored a third color (e.g., blue). Portions of the 3-D representation outside of the virtual region may remain unchanged.

At step 970, it is determined if the tool is still activated, if so, execution loops back to step 940, such that the location of the cursor is updated, the virtual region moved based on the new location of the cursor, and potentially now portions of the 3-D representation highlighted, through repetition of steps 940-960. If the tool is not still activated, the sequence of steps ends.

While the above description discusses various embodiments of the present disclosure, it should be apparent that a number of modifications and/or additions may be made without departing from the disclosure's intended spirit and scope.

While portions of the above description discusses the example of the tool being applied to points of a point cloud, it should be understood that the tool may be applied to a variety of other types of 3-D representations, that may or may not be based on a collec-tion of points. For example, the 3-D representation may be a 3-D CAD model and the portions may be vector elements of the 3-D CAD model. Alternatively, the 3-D representation may be a terrain model and the portions may be triangles of a triangle-mesh of the terrain model. A wide variety of other 3-D representations may alternatively be utilized.

While portions of the above description discuss the example of the virtual region being formed as a virtual cylinder whose size is defined by a height and a radius, it should be understood that the virtual region may have any of a variety of different shapes. For example, the virtual region may be shaped as a rectangular prism. Alternatively, the virtual region may be shaped as a sphere or ellipsoid. A wide variety of other 3-D shapes may alternatively be employed.

While portions of the above description discusses an example where the virtual region is used to re-color portions of a 3-D representation, it should be understood that the tool may be utilized to highlight a 3-D representation in a verity of different manners, that may or may not change a dominant color of the portion of the representation. For example, a saturation or intensity may be changed, while maintaining the same general color. A wide variety of other highlighting effect may alternatively be utilized.

While portions of the above description discusses an example where the virtual region is used with a reconstruction procedure, it should be understood that it may be of use in a variety of other procedures.

Furthermore, it should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method for visualizing a three-dimensional (3-D) representation, comprising:

displaying at least a part of the 3-D representation within a user interface of an application shown on a display screen of an electronic device;

determining a user-selected size based on input in the user interface of the application;

displaying a cursor within the user interface that is associated with a point within 3-D space of the 3-D representation, the cursor controlled by a pointing device of the electronic device;

imposing, by the application, a 3-D virtual region that surrounds the point associated with the cursor within 3-D space of the 3-D representation, the 3-D virtual region defined in reference to a cursor plane that extends through the point associated with the cursor and a normal vector that extends from the point associated with the cursor in a direction that determines the orientation of the 3-D virtual region, the 3-D virtual region having a forward part located to a forward side of the cursor plane in the direction of the normal vector and a backward part located to a backward side of the cursor plane away from the direction of the normal vector, the 3-D virtual region having the user-selected size;
in response to the 3-D virtual region, highlighting, by the application, portions of the 3-D representation that fall within the 3-D virtual region, while maintaining all portions of the 3-D representation outside of the 3-D virtual region unchanged; and
dynamically changing the highlighted portions of the 3-D representation as the 3-D virtual region is moved in response to changes in position of the cursor.

2. The method of claim 1, wherein the 3-D representation is a point cloud and each portion of the 3-D representation is a point.

3. The method of claim 1, wherein the 3-D virtual region is a virtual cylinder.

4. The method of claim 1, wherein the highlighting comprises re-coloring.

5. The method of claim 1, wherein the pointing device is a 2-D pointing device.

6. A method for visualizing a three-dimensional (3-D) representation, comprising:
displaying at least a part of the 3-D representation within a user interface of an application shown on a display screen of an electronic device;
determining a user-selected size based on input in the user interface of the application;
displaying a cursor within the user interface that is associated with a point within 3-D space of the 3-D representation, the cursor controlled by a pointing device of the electronic device;
imposing, by the application, a 3-D virtual region that is defined in reference to a cursor plane that extends through the point associated with the cursor and a normal vector that extends from the point associated with the cursor in a direction that determines the orientation of the 3-D virtual region, the 3-D virtual region having at least an on plane part that encompasses a threshold distance from the cursor plane, a forward part located to a forward side of the cursor plane in the direction of the normal vector and a backward part located to a backward side of the cursor plane away from the direction of the normal vector; and
highlighting, by the application, portions of the 3-D representation that fall within the 3-D virtual region, wherein the highlighting highlights portions of the 3-D representation that fall within the on plane part of the 3-D virtual region with respect to the cursor plane in a first manner, highlights portions of the 3-D representation that fall within the forward part of the 3-D virtual region with respect to the cursor plane in a second manner, the second manner different than the first manner, and highlights portions of the 3-D representation that fall within the backward part of the 3-D virtual region with respect to the cursor plane in a third manner, the third manner different than both the first manner and the second manner.

7. The method of claim 6, wherein the first manner comprises re-coloring with a first color, the second manner comprises re-coloring with a second color that is different than the first color, and the third manner comprises re-coloring with a third color that is different than both the first color and the second color.

8. The method of claim 6, wherein the 3-D virtual region is a virtual cylinder, and the on plane part, forward part, and backward part are each cylinder segments.

9. The method of claim 8, when the user-selected size comprises a height and a radius.

10. The method of claim 6, wherein the cursor plane bisects the 3-D virtual region.

11. The method of claim 10, wherein the point associated with the cursor is located at a position of a pointer, the pointer configured to snap to the position of a portion of the 3-D representation when the cursor is within a threshold distance of a projection of the portion.

12. An apparatus to visualize a three-dimensional (3-D) representation, comprising:
a display screen configured to display a user interface;
a pointing device configured to move a cursor within the user interface;
a processor; and
a memory coupled to the processor and configured to store instructions for an application that is executable on the processor, the instructions for the application, when executed, operable to:
display at least a part of the 3-D representation within the user interface on the display screen,
display the cursor within the user interface that is associated with a point within 3-D space of the 3-D representation,
impose a 3-D virtual region that surrounds the point associated with the cursor, the 3-D virtual region defined in reference to a cursor plane that extends through the point associated with the cursor and a normal vector that extends from the point associated with the cursor in a direction that determines the orientation of the 3-D virtual region, the 3-D virtual region having a forward part located to a forward side of the cursor plane in the direction of the normal vector and a backward part located to a backward side of the cursor plane away from the direction of the normal vector,
in response to the 3-D virtual region, highlight portions of the 3-D representation that fall within the 3-D virtual region, while maintaining all portions of the 3-D representation outside of the 3-D virtual region unchanged, and
dynamically change the highlighted portions of the 3-D representation as the 3-D virtual region is moved in response to changes in position of the cursor.

13. The apparatus of claim 12, wherein the 3-D representation is a point cloud and each portion of the 3-D representation is a point.

14. The apparatus of claim 12, wherein the 3-D virtual region is a virtual cylinder.

15. The apparatus of claim 12, wherein the instructions for the application that, when executed, are operable to highlight are arranged to re-color portions of the 3-D representation.

16. An apparatus to visualize a three-dimensional (3-D) representation, comprising:
a display screen configured to display a user interface;
a pointing device configured to move a cursor within the user interface;
a processor; and
a memory coupled to the processor and configured to store instructions for an application that is executable on the processor, the instructions for the application, when executed, operable to:
display at least a part of the 3-D representation within the user interface on the display screen, display the cursor within the user interface that is associated with a point within 3-D space of the 3-D representation, impose a 3-D virtual region that is defined in reference to a cursor plane that extends through the point associated with the cursor and a normal vector that extends from the point associated with the cursor in a direction that determines the orientation of the 3-D virtual region, the 3-D virtual region having at least an on plane part that encompasses a threshold distance from the cursor plane, a forward part located to a forward side of the cursor plane in the direction of the normal vector and a backward part located to a backward side of the cursor plane away from the direction of the normal vector, highlight portions of the 3-D representation that fall within the on plane part of the 3-D virtual region with respect to the cursor plane in a first manner, highlight portions of the 3-D representation that fall within the forward part of the 3-D virtual region with respect to the cursor plane in a second manner, the second manner different than the first manner, and highlight portions of the 3-D representation that fall within the backward part of the 3-D virtual region with respect to the cursor plane in a third manner, the third manner different than both the first manner and the second manner, and dynamically change the highlighted portions of the 3-D representation as the 3-D virtual region is moved in response to changes in position of the cursor.

17. The apparatus of claim 16, wherein the first manner comprises re-coloring with a first color, the second manner comprises re-coloring with a second color that is different than the first color, and the third manner comprises re-coloring with a third color that is different than both the first color and the second color.

18. A non-transitory computer-readable medium that includes instructions executable on a processor, the instructions, when executed, operable to:

display at least a part of the 3-D representation within a user interface of an application shown on a display screen of an electronic device;

display a cursor controlled by a pointing device of the electronic device within the user interface, the cursor associated with a point within 3-D space of the 3-D representation;

impose a 3-D virtual region that surrounds the point associated with the cursor within 3-D space of the 3-D representation, the 3-D virtual region defined in reference to a cursor plane that extends through the point associated with the cursor and a normal vector that extends from the point associated with the cursor in a direction that determines the orientation of the 3-D virtual region, the 3-D virtual region having a forward part located to a forward side of the cursor plane in the direction of the normal vector and a backward part located to a backward side of the cursor plane away from the direction of the normal vector;

in response to imposing the 3-D virtual region, highlight portions of the 3-D representation that fall within the 3-D virtual region, while maintaining portions of the 3-D representation outside of the 3-D virtual region unchanged; and dynamically change the highlighted portions of the 3-D representation as the 3-D virtual region is moved in response to changes in position of the cursor.

19. The non-transitory computer-readable medium of claim 18, wherein the 3-D representation is a point cloud and each portion of the 3-D representation is a point.

20. A non-transitory computer-readable medium that includes instructions executable on a processor, the instructions, when executed, operable to:

display at least a part of the 3-D representation within a user interface of an application shown on a display screen of an electronic device;

display a cursor controlled by a pointing device of the electronic device within the user interface, the cursor associated with a point within 3-D space of the 3-D representation;

impose a 3-D virtual region that is defined in reference to a cursor plane that extends through the point associated with the cursor and a normal vector that extends from the point associated with the cursor in a direction that determines the orientation of the 3-D virtual region, the 3-D virtual region having at least a first part located to a first side of the cursor plane in the direction and a second part located to a second side of the cursor plane away from the direction of the normal vector;

highlight portions of the 3-D representation that fall within the first part of the 3-D virtual region in a first manner; and highlight portions of the 3-D representation that fall within the second part of the 3-D virtual region in a second manner, the second manner different than the first manner.

21. The non-transitory computer-readable medium of claim 18, wherein the cursor plane bisects the 3-D virtual region.

22. The non-transitory computer-readable medium of claim 20, wherein the cursor plane bisects the 3-D virtual region.

23. The non-transitory computer-readable medium of claim 20, wherein the instructions operable to highlight portions of the 3-D representation that fall within the 3-D virtual region are further operable to:

highlight portions of the 3-D representation that fall within a third part of the 3-D virtual region that encompasses a threshold distance from the cursor plane in a third manner, the third manner different than both the first manner and the second manner.

24. A method for visualizing a three-dimensional (3-D) representation, comprising:

displaying at least a part of the 3-D representation within a user interface of an application shown on a display screen of an electronic device;

associating a point within 3-D space of the 3-D representation with a cursor controlled by a pointing device of the electronic device;

imposing, by the application, a 3-D virtual region within 3-D space of the 3-D representation, the 3-D virtual region defined in reference to a cursor plane that extends through the point associated with the cursor and a normal vector that extends from the point associated with the cursor in a direction that determines the orientation of the 3-D virtual region, the 3-D virtual region having at least an on plane part that encompasses a threshold distance from the cursor plane, a first part located to a first side of the cursor plane in the direction of the normal vector and a second part located to a second side of the cursor plane away from the direction of the normal vector;

highlighting portions of the 3-D representation that fall within the on plane part of the 3-D virtual region in a first manner, portions of the 3-D representation that fall within the first part of the 3-D virtual region in a second manner and portions of the 3-D representation that fall within the second part of the 3-D virtual region in a third manner, the first manner, second manner, and third manner each different from one another; and dynamically changing the highlighted portions of the 3-D representation as the 3-D virtual region is moved in response to changes in position of the cursor and different portions of the 3-D representation that fall within the on plane part of the 3-D virtual region, the first part of the 3-D virtual region and the second part of the 3-D virtual region.

25. The method of claim 24, wherein the 3-D virtual region is a virtual cylinder, and the on plane part, first part, and second part are each cylinder segments.

\* \* \* \* \*

UNITED STATES PATENT AND TRADEMARK OFFICE
CERTIFICATE OF CORRECTION

PATENT NO. : 10,162,471 B1
APPLICATION NO. : 13/631097
DATED : December 25, 2018
INVENTOR(S) : Benoit Fredericque Page 1 of 2

It is certified that error appears in the above-identified patent and that said Letters Patent is hereby corrected as shown below:

In the Specification

Column 1, Lines 31-32 read:
"Other 3-D laser scanners rely on some form of triangulation like a"
Should read:
--Other 3-D laser scanners rely on some form of triangulation. Like a--

Column 2, Lines 6-7 read:
"Points that visually appear proxi-mate to each other on a display screen"
Should read:
--Points that visually appear proximate to each other on a display screen--

Column 2, Line 30 reads:
"points in the point cloud may be lost when a user fo-cuses"
Should read:
--points in the point cloud may be lost when a user focuses--

Column 2, Line 32 reads:
"that may provide help-ful 3-D context may be relegated to"
Should read:
--that may provide helpful 3-D context may be relegated to--

Column 2, Line 42 reads:
"sectioning the point cloud, and navi-gating among the vari-"
Should read:
--sectioning the point cloud, and navigating among the vari- --

Signed and Sealed this
Ninth Day of July, 2019

Andrei Iancu
*Director of the United States Patent and Trademark Office*

CERTIFICATE OF CORRECTION (continued)
U.S. Pat. No. 10,162,471 B1

Column 4, Line 6 reads:
"memory 130, such as a Ran-dom Access Memory (RAM), is"
Should read:
--memory 130, such as a Random Access Memory (RAM), is--

Column 4, Line 61 reads:
"networking protocols, to permit a variety of dis-tributed,"
Should read:
--networking protocols, to permit a variety of distributed,--

Column 5, Line 4 reads:
"point cloud may be utilized for a variety of pur-poses. In"
Should read:
--point cloud may be utilized for a variety of purposes. In--

Column 6, Line 13 reads:
"located in 3-D space at a de-fault depth. This pointer may be"
Should read:
--located in 3-D space at a default depth. This pointer may be--

Column 8, Line 2 reads:
"may not be based on a collec-tion of points. For example, the"
Should read:
--may not be based on a collection of points. For example, the--